United States Patent
Zhuang et al.

(10) Patent No.: US 10,057,074 B2
(45) Date of Patent: Aug. 21, 2018

(54) POWER OVER ETHERNET (POE) POWER SUPPLYING METHOD AND APPARATUS

(71) Applicant: Huawei Technologies Co., Ltd., Shenzhen (CN)

(72) Inventors: Yan Zhuang, Nanjing (CN); Shiyong Fu, Nanjing (CN); Hua Chen, Nanjing (CN); Xiuju Liang, Nanjing (CN); Jincan Cao, Nanjing (CN); Rui Hua, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 15/066,630

(22) Filed: Mar. 10, 2016

(65) Prior Publication Data

US 2016/0269187 A1 Sep. 15, 2016

(30) Foreign Application Priority Data

Mar. 10, 2015 (CN) .......................... 2015 1 0105380

(51) Int. Cl.
*H04L 12/10* (2006.01)
*H04L 12/40* (2006.01)
*G06F 1/26* (2006.01)

(52) U.S. Cl.
CPC ................ *H04L 12/10* (2013.01); *G06F 1/26* (2013.01); *H04L 12/40045* (2013.01);
(Continued)

(58) Field of Classification Search
CPC ..................................................... H04L 12/10
See application file for complete search history.

(56) References Cited

U.S. PATENT DOCUMENTS 8,112,641 B2 * 2/2012 Schindler ............... H04L 12/10
713/300
2006/0210057 A1 9/2006 Stanford
(Continued)

FOREIGN PATENT DOCUMENTS

JP 2008529463 A 7/2008
JP 2012518820 A 8/2012

OTHER PUBLICATIONS

Abramson, David. "4PPoE: Maximizing Interoperability with 902.3-2012 Devices (and other things)". Texas Instruments. Nov. 2013. Downloaded from http://ieee802.org/3/4PPOE/public/nov13/abramson_01_1113.pdf on Sep. 29, 2017.*
(Continued)

Primary Examiner — Kim Ngoc Huynh
Assistant Examiner — Joshua Neveln
(74) Attorney, Agent, or Firm — Huawei Technologies Co., Ltd.

(57) ABSTRACT

A power over Ethernet method where power sourcing equipment (PSE) detects and determines that a first set of cable pairs and a second set of cable pairs of an Ethernet twisted pair are connected to a valid powered device (PD), the PSE receives a link layer discovery protocol data unit (LLDPDU) from the PD, where the LLDPDU includes a load quantity type-length-value (TLV) used to notify a quantity of PD loads included in the PD, and when the PD receives power from both the first set of cable pairs and the second set of cable pairs, and the PD includes two PD interfaces, and the PD includes two PD loads, the PSE supplies power to the PD at a first power using the first set of cable pairs, and supplies power to the PD at a second power using the second set of cable pairs.

15 Claims, 5 Drawing Sheets

---

PSE detects and determines that both a first set of cable pairs and a second set of cable pairs of an Ethernet twisted pair are connected to a valid powered device — 501

The PSE receives a first LLDPDU from a PD, where the first LLDPDU includes a load quantity TLV, and the load quantity TLV is used to notify a quantity of PD loads included in the PD — 502

In a case in which the PSE determines that the PD includes two PD interfaces and the two PD interfaces are separately connected to the first set of cable pairs and the second set of cable pairs, if the PSE determines, according to the load quantity TLV, that the PD includes two PD loads, the PSE supplies power to the PD at a first power by using the first set of cable pairs, and supplies power to the PD at a second power by using the second set of cable pairs — 503

(52) U.S. Cl.
CPC .............. *Y02D 30/30* (2018.01); *Y02D 30/32* (2018.01); *Y02D 50/30* (2018.01)

(56) References Cited

U.S. PATENT DOCUMENTS

| | | | |
|---|---|---|---|
| 2007/0135086 A1* | 6/2007 | Stanford | H04L 12/10 455/402 |
| 2009/0164805 A1 | 6/2009 | Diab et al. | |
| 2011/0133551 A1* | 6/2011 | Moller | G06F 1/266 307/11 |
| 2011/0241425 A1 | 10/2011 | Hunter et al. | |
| 2011/0298428 A1 | 12/2011 | Liu | |
| 2013/0049469 A1* | 2/2013 | Huff | G06F 1/266 307/62 |

OTHER PUBLICATIONS

"Part 3: Carrier Sense Multiple Access with Collision Detection (CSMA/CD) Access Method and Physical Layer Specifications, Amendment 3: Data Terminal Equipment (DTE) Power via the Media Dependent Interface (MDI) Enhancements," IEEE Computer Society, 802.3at, Oct. 30, 2009, 141 pages.

"Part 3: Carrier Sense Multiple Access with Collision Detection (CSMA/CD) Access Method and Physical Layer Specifications, Amendment: Data Terminal Equipment (DTE) Power via Media Dependent Interface (MDI)," IEE Standards, 802.3af, Jun. 18, 2003, 133 pages.

White Paper: "Cisco Universal Power Over Ethernet: Unleash the Power of your Network," XP055285951, Cisco, Retrieved from the Internet: URL:http://www.cisco.com/c/en/us/products/collateral/switches/catalyst-4500-series-switches/white_paper_c11-670993.pdf [retrieved on Jul. 5, 2016], Sep. 2014, 14 pages.

Schindler, F., "Link Layer Discovery Protocol LLDP v0.6," XP055286019, Retrieved from the Internet: URL: http://www.ieee802.org/3/bt/public/jan15/schindler_3bt_1_01_15.pdf, [retrieved on Jul. 5, 2016], Jan. 2015, 16 pages.

Foreign Communication From a Counterpart Application, European Application No. 16159623.4, Extended European Search Report dated Jul. 13, 2016, 9 pages.

Partial English Translation and Abstract of Japanese Patent Application No. JPA2008529463, Jul. 31, 2008, 15 pages.

Partial English Translation and Abstract of Japanese Patent Application No. JPA2012518820, Aug. 16, 2012, 24 pages.

Foreign Communication From a Counterpart Application, Japanese Application No. 2016-045819, Japanese Office Action dated Dec. 27, 2016, 3 pages.

Foreign Communication From a Counterpart Application, Japanese Application No. 2016-045819, English Translation of Japanese Office Action dated Dec. 27, 2016, 3 pages.

* cited by examiner

POWER OVER ETHERNET (POE) POWER SUPPLYING METHOD AND APPARATUS

CROSS-REFERENCE TO RELATED APPLICATION

This application claims priority to Chinese Patent Application No. 201510105380.X, filed on Mar. 10, 2015, which is hereby incorporated by reference in its entirety.

TECHNICAL FIELD

The present disclosure relates to the field of power over Ethernet technologies, and in particular, to a power over Ethernet method and an apparatus.

BACKGROUND

Power over Ethernet (PoE) is a technology that transmits both Ethernet data and power using a twisted pair, where the power refers to supplied electricity.

According to rules of the Telecommunications Industry Association (TIA)/Electronic Industries Alliance (EIA) 568 (TIA/EIA-568), a cable pair 3 includes a cable (cable 1) connected to a pin 1 and a cable (cable 2) connected to a pin 2 that are in an 8 position 8 contact (8P8C) modular connector of an Ethernet twisted pair, and a cable pair 2 includes a cable (cable 3) connected to a pin 3 and a cable (cable 6) connected to a pin 6 that are in the 8P8C modular connector. A cable pair 1 includes a cable (cable 4) connected to a pin 4 and a cable (cable 5) connected to a pin 5 that are in the 8P8C modular connector, and a cable pair 4 includes a cable (cable 7) connected to a pin 7 and a cable (cable 8) connected to a pin 8 that are in the 8P8C modular connector.

A PoE device includes two categories: power sourcing equipment (PSE) and a powered device (PD), and the PoE device may also be both the PSE and the PD. The PSE is equipment supplying power to the PD. The PD is a device, for example, an Internet Protocol (IP) telephone, a web camera, a wireless access point (AP), a personal digital assistant (PDA), an IP camera, a light emitting diode (LED) lamp, or a notebook computer, that receives power.

Conventional PSE supports supplying power using only two cable pairs. For example, the PSE supports supplying power using only a cable 1, a cable 2, a cable 3, and a cable 6 that are in an Ethernet twisted pair, or using only a cable 4, a cable 5, a cable 7, and a cable 8 that are in an Ethernet twisted pair. For example, if the PSE supplies power using the cable 1, the cable 2, the cable 3, and the cable 6 that are in the Ethernet twisted pair, the PSE sends a detection signal to a peer end, and when detecting that a resistance and a capacitance of the peer end fall within a given range, for example, the resistance falls within a range of 19 kilohm (10 to 26.5 k$\Omega$, and the capacitance is 0.150 microfarad ($\mu$F), the PSE determines that the peer end is connected to a valid PD.

A negotiation level between the PSE and the PD is level 0 to level 4. When the negotiation level is level 4, the PSE supplies maximum power, and output power is approximately 30 watt (W). With development of PoE application, categories of the PD become increasingly rich, and there are more PDs having a power requirement of being greater than 30 W, and are generally referred to as high power powered devices. When a power required by a PD is greater than 30 W, the PSE needs to supply power using four cable pairs, that is, supply power to the PD using both a first set of cable pairs and a second set of cable pairs. The first set of cable pairs, also referred to as an Alternative A (ALT A), includes a cable pair 2 and a cable pair 3, that is, includes a cable 1, a cable 2, a cable 3, and a cable 6. The second set of cable pairs, also referred to as an Alternative B (ALT B), includes a cable pair 1 and a cable pair 4, that is, includes a cable 4, a cable 5, a cable 7, and a cable 8.

However, currently, when supplying power using four cable pairs, the PSE still cannot distinguish PDs of different design types. Therefore, the PSE cannot supply power to a PD correctly and effectively according to a design type of the PD at a peer end, resulting in cases in which supplied power is insufficient, causing a power outage of the PD, or distributed power is excessively high, causing a waste of system power.

SUMMARY

Embodiments of the present disclosure provide a power over Ethernet method and an apparatus, which can determine a design type of a PD at a peer end in order to correctly and effectively supply power to the PD connected at the peer end.

According to a first aspect, a power over Ethernet method is provided, including detecting and determining, by PSE, that both a first set of cable pairs and a second set of cable pairs of an Ethernet twisted pair are connected to a valid powered device, receiving, by the PSE, a first Link Layer Discovery Protocol data unit (LLDPDU) from a PD, where the first LLDPDU includes a load quantity type-length-value (TLV), and the load quantity TLV is used to notify a quantity of PD loads included in the PD, and the PD is connected to the PSE using the Ethernet twisted pair, and in a case in which the PSE determines that the PD receives power from both the first set of cable pairs and the second set of cable pairs, and the PD includes two PD interfaces, if the PSE determines, according to the load quantity TLV, that the PD includes two PD loads, supplying, by the PSE, power to the PD at a first power using the first set of cable pairs, and supplying power to the PD at a second power using the second set of cable pairs, where the first power and the second power are independent of each other.

With reference to the first aspect, in a first possible implementation manner of the first aspect, the first LLDPDU further includes a power request TLV, and the power request TLV includes a first required power of the first set of cable pairs and a second required power of the second set of cable pairs, and correspondingly, the method further includes sending, by the PSE, a second LLDPDU to the PD, where the second LLDPDU includes a power allocation TLV, and the power allocation TLV includes the first power that is allocated by the PSE to the first set of cable pairs and the second power that is allocated to the second set of cable pairs.

With reference to the first aspect, in a second possible implementation manner of the first aspect, the method further includes, if the PSE determines, according to the load quantity TLV, that the PD includes only one PD load, supplying, by the PSE, power to the PD according to power requirement information of the PD.

With reference to the second possible implementation manner of the first aspect, in a third possible implementation manner of the first aspect, the first LLDPDU further includes a power request TLV, and the power request TLV includes a first required power of the first set of cable pairs and a second required power of the second set of cable pairs, and correspondingly, the supplying, by the PSE, power to the PD according to power requirement information of the PD includes allocating, by the PSE, a third power to the first set of cable pairs and the second set of cable pairs according to the first required power and the second required power that are in the power request TLV, sending, by the PSE, a third LLDPDU to the PD, where the third LLDPDU includes a power allocation TLV, and the power allocation TLV includes the third power that is allocated by the PSE to the first set of cable pairs and the second set of cable pairs, and supplying, by the PSE, power to the PD at the third power using both the first set of cable pairs and the second set of cable pairs such that the PD load obtains power using both the first set of cable pairs and the second set of cable pairs.

With reference to the third possible implementation manner of the first aspect, in a fourth possible implementation manner of the first aspect, if the first required power and the second required power that are requested in the power request TLV are different, the third LLDPDU further includes a power request error indication, which is used to indicate, to the PD, an error of a required power requested in the power request TLV, and the third power is a smaller required power of the first required power and the second required power that are in the power request TLV.

With reference to the second possible implementation manner of the first aspect, in a fifth possible implementation manner of the first aspect, the first LLDPDU further includes a power request TLV, and the power request TLV includes a total required power of the Ethernet twisted pair, and correspondingly, the supplying, by the PSE, power to the PD according to power requirement information of the PD includes allocating, by the PSE, a total power to the Ethernet twisted pair according to the total required power in the power request TLV, sending, by the PSE, a fourth LLDPDU to the PD, where the fourth LLDPDU includes a power allocation TLV, and the power allocation TLV includes the total power that is allocated by the PSE to the Ethernet twisted pair, and if the total required power in the power request TLV is not greater than a given power value, supplying, by the PSE, power to the PD at the total power using only the first set of cable pairs, or using only the second set of cable pairs, or using both the first set of cable pairs and the second set of cable pairs such that the PD load obtains power using the first set of cable pairs or the second set of cable pairs, or if the total required power in the power request TLV is greater than a given power value, supplying, by the PSE, power to the PD at half the total power using both the first set of cable pairs and the second set of cable pairs such that the PD load obtains power using both the first set of cable pairs and the second set of cable pairs.

With reference to the second possible implementation manner of the first aspect, in a sixth possible implementation manner of the first aspect, the first LLDPDU further includes a power request TLV, and the power request TLV includes a required power of the first set of cable pairs or the second set of cable pairs, and correspondingly, the supplying, by the PSE, power to the PD according to power requirement information of the PD includes allocating, by the PSE, a fourth power to the first set of cable pairs or the second set of cable pairs according to the required power of the first set of cable pairs or the second set of cable pairs in the power request TLV, sending, by the PSE, a fifth LLDPDU to the PD, where the fifth LLDPDU includes a power allocation TLV, and the power allocation TLV includes the fourth power that is allocated by the PSE to the first set of cable pairs or the second set of cable pairs, and supplying, by the PSE, power to the PD at the fourth power using the first set of cable pairs or the second set of cable pairs such that the PD load obtains power using the first set of cable pairs or the second set of cable pairs.

With reference to any one of the first aspect and the first to sixth possible implementation manners of the first aspect, in a seventh possible implementation manner of the first aspect, the first LLDPDU further includes a power receiving configuration TLV, and the power receiving configuration TLV is used to notify the PSE of a status of a configuration of receiving power by the PD from the Ethernet twisted pair, and correspondingly, the method further includes determining, by the PSE according to the power receiving configuration TLV, that the PD receives power from both the first set of cable pairs and the second set of cable pairs.

With reference to the seventh possible implementation manner of the first aspect, in an eighth possible implementation manner of the first aspect, the first LLDPDU further includes an interface quantity TLV, and the interface quantity TLV is used to notify the PSE of a quantity of PD interfaces included in the PD, and correspondingly, the method further includes, when the PSE determines that the PD receives power from both the first set of cable pairs and the second set of cable pairs, determining, by the PSE according to the interface quantity TLV, whether the PD includes two PD interfaces.

With reference to any one of the first aspect and the first to eighth possible implementation manners of the first aspect, in a ninth possible implementation manner of the first aspect, the detecting and determining, by PSE, that both a first set of cable pairs and a second set of cable pairs of an Ethernet twisted pair are connected to a valid powered device includes sending, by the PSE, a first detection voltage or a first detection current to a peer end along the first set of cable pairs, and obtaining a first impedance, sending, by the PSE, a second detection voltage or a second detection current to the peer end along the second set of cable pairs in the Ethernet twisted pair, and obtaining a second impedance, and if both the first impedance and the second impedance fall within the preset range, determining that both the first set of cable pairs and the second set of cable pairs are connected to a valid powered device.

According to a second aspect, PSE is provided, including a first detection module configured to detect and determine whether both a first set of cable pairs and a second set of cable pairs of an Ethernet twisted pair are connected to a valid powered device, a receiving module configured to receive a first LLDPDU from a PD, where the first LLDPDU includes a load quantity TLV, and the load quantity TLV is used to notify a quantity of PD loads included in the PD, and the PD is connected to the PSE using the Ethernet twisted pair, a first determining module configured to, in a case in which the PSE determines that the PD receives power from both the first set of cable pairs and the second set of cable pairs, and the PD includes two PD interfaces, determine, according to the load quantity TLV, whether the PD includes two PD loads or one PD load, and a first power supply module configured to, when the first determining module determines that the PD includes two PD loads, supply power to the PD at a first power using the first set of cable pairs, and supply power to the PD at a second power using the second set of cable pairs, where the first power and the second power are independent of each other.

With reference to the second aspect, in a first possible implementation manner of the second aspect, the first LLDPDU further includes a power request TLV, and the power request TLV includes a first required power of the first set of cable pairs and a second required power of the second set of cable pairs, and correspondingly, the first power supply module is further configured to send a second LLDPDU to the PD, where the second LLDPDU includes a power allocation TLV, and the power allocation TLV includes the first power that is allocated by the PSE to the first set of cable pairs and the second power that is allocated to the second set of cable pairs.

With reference to the second aspect, in a second possible implementation manner of the second aspect, the PSE further includes a second power supply module configured to supply power to the PD according to power requirement information of the PD when the first determining module determines that the PD includes only one PD load.

With reference to the second possible implementation manner of the second aspect, in a third possible implementation manner of the second aspect, the first LLDPDU further includes a power request TLV, and the power request TLV includes a first required power of the first set of cable pairs and a second required power of the second set of cable pairs, and the second power supply module is further configured to allocate a third power to the first set of cable pairs and the second set of cable pairs according to the first required power and the second required power that are in the power request TLV, send a third LLDPDU to the PD, where the third LLDPDU includes a power allocation TLV, and the power allocation TLV includes the third power that is allocated by the PSE to the first set of cable pairs and the second set of cable pairs, and supply power to the PD at the third power using both the first set of cable pairs and the second set of cable pairs such that the PD load obtains power using both the first set of cable pairs and the second set of cable pairs.

With reference to the third possible implementation manner of the second aspect, in a fourth possible implementation manner of the second aspect, if the first required power and the second required power that are requested in the power request TLV are different, the third LLDPDU further includes a power request error indication, which is used to indicate, to the PD, an error of a required power requested in the power request TLV, and the third power is a smaller required power of the first required power and the second required power that are in the power request TLV.

With reference to the second possible implementation manner of the second aspect, in a fifth possible implementation manner of the second aspect, the first LLDPDU further includes a power request TLV, and the power request TLV includes a total required power of the Ethernet twisted pair, and correspondingly, the second power supply module is further configured to allocate a total power to the Ethernet twisted pair according to the total required power in the power request TLV, send a fourth LLDPDU to the PD, where the fourth LLDPDU includes a power allocation TLV, and the power allocation TLV includes the total power that is allocated by the PSE to the Ethernet twisted pair, and if the total required power in the power request TLV is not greater than a given power value, supply power to the PD at the total power using only the first set of cable pairs, or using only the second set of cable pairs, or using both the first set of cable pairs and the second set of cable pairs such that the PD load obtains power using the first set of cable pairs or the second set of cable pairs, or if the total required power in the power request TLV is greater than a given power value, supply power to the PD at half the total power using both the first set of cable pairs and the second set of cable pairs such that the PD load obtains power using both the first set of cable pairs and the second set of cable pairs.

With reference to the second possible implementation manner of the second aspect, in a sixth possible implementation manner of the second aspect, the first LLDPDU further includes a power request TLV, and the power request TLV includes a required power of the first set of cable pairs or the second set of cable pairs, and correspondingly, the second power supply module is further configured to allocate a fourth power to the first set of cable pairs or the second set of cable pairs according to the required power of the first set of cable pairs or the second set of cable pairs in the power request TLV, send a fifth LLDPDU to the PD, where the fifth LLDPDU includes a power allocation TLV, and the power allocation TLV includes the fourth power that is allocated by the PSE to the first set of cable pairs or the second set of cable pairs, and supply power to the PD at the fourth power using the first set of cable pairs or the second set of cable pairs such that the PD load obtains power using the first set of cable pairs or the second set of cable pairs.

With reference to any one of the second aspect and the first to sixth possible implementation manners of the second aspect, in a seventh possible implementation manner of the second aspect, the first LLDPDU further includes a power receiving configuration TLV, and the power receiving configuration TLV is used to notify the PSE of a status of a configuration of receiving power by the PD from the Ethernet twisted pair, and the PSE further includes a second determining module configured to determine, according to the power receiving configuration TLV, whether the PD receives power from both the first set of cable pairs and the second set of cable pairs.

With reference to the seventh possible implementation manner of the second aspect, in an eighth possible implementation manner of the second aspect, the first LLDPDU further includes an interface quantity TLV, and the interface quantity TLV is used to notify the PSE of a quantity of PD interfaces included in the PD. The PSE further includes a third determining module configured to, when the second determining module determines that the PD receives power from both the first set of cable pairs and the second set of cable pairs, determine, according to the interface quantity TLV, whether the PD includes two PD interfaces.

With reference to any one of the second aspect and the first to eighth possible implementation manners of the second aspect, in a ninth possible implementation manner of the second aspect, the first detection module is further configured to send a first detection voltage or a first detection current to a peer end along the first set of cable pairs, and obtain a first impedance, send a second detection voltage or a second detection current to the peer end along the second set of cable pairs in the Ethernet twisted pair, and obtain a second impedance, and if both the first impedance and the second impedance fall within the preset range, determine that both the first set of cable pairs and the second set of cable pairs are connected to a valid powered device.

According to a third aspect, a power over Ethernet system is provided, including a PD and the PSE according to any one of the second aspect and the first to ninth possible implementation manners of the second aspect, where the PSE supports supplying power using four pairs of cables, and the PD is connected to the PSE using an Ethernet twisted pair, and the PD is configured to send a first LLDPDU to the PSE, where the first LLDPDU includes a load quantity TLV, and the load quantity TLV is used to notify a quantity of PD loads included in the PD.

According to the PoE method, the device, and the system that are provided in the embodiments of the present disclosure, the PSE detects and determines that both a first set of cable pairs and a second set of cable pairs of an Ethernet twisted pair are connected to a valid powered device, receives a first LLDPDU sent by a PD, where the PD is connected to the PSE using the Ethernet twisted pair, in a case in which the PSE determines that the PD receives power from both the first set of cable pairs and the second set of cable pairs, and the PD includes two PD interfaces, determines, according to a load quantity TLV in the first LLDPDU, whether the PD includes one PD load or two PD loads such that a design type of the PD is determined. When it is determined that the PD includes two PD loads, separately supplies, using the first set of cable pairs and the second set of cable pairs, power to the two PD loads at powers that are independent of each other. Therefore, it is ensured that power can be supplied to a PD correctly and effectively.

DESCRIPTION OF EMBODIMENTS

The Link Layer Discovery Protocol (LLDP) provides a standard link layer discovery manner in which information such as a main capability, a management address, a device identifier, and an interface identifier of a local device may be organized as different TLV, and the different TLV are encapsulated into a LLDPDU, and are notified to a neighbor.

Embodiments of the present disclosure are described below with reference to the accompanying drawings of the specification.

In a case in which PSE supports supplying power using four cable pairs, a PD may be connected to the PSE in different manners, a PD connected to the PSE may also have different design types, and different PoE scenarios shown in FIG. 1 to FIG. 4 may be included.

In the embodiments of the present disclosure, a PD interface refers to a circuit or a logical unit that is in a PD and that provides power supply characteristic information and control, for example, detection, classification, and disconnection.

Figure 1:
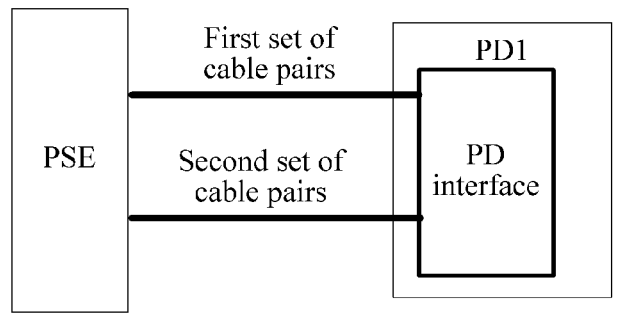
FIG. 1 is a schematic diagram 1 of a power over Ethernet scenario according to an embodiment of the present disclosure.

Referring to FIG. 1, FIG. 1 is a schematic diagram 1 of a PoE scenario according to an embodiment of the present disclosure. A PD 1 is connected to PSE using a standard Ethernet twisted pair. The PD 1 includes only one PD interface, and both a first set of cable pairs and a second set of cable pairs of the standard Ethernet twisted pair are connected to the PD interface of the PD 1.

Figure 2:
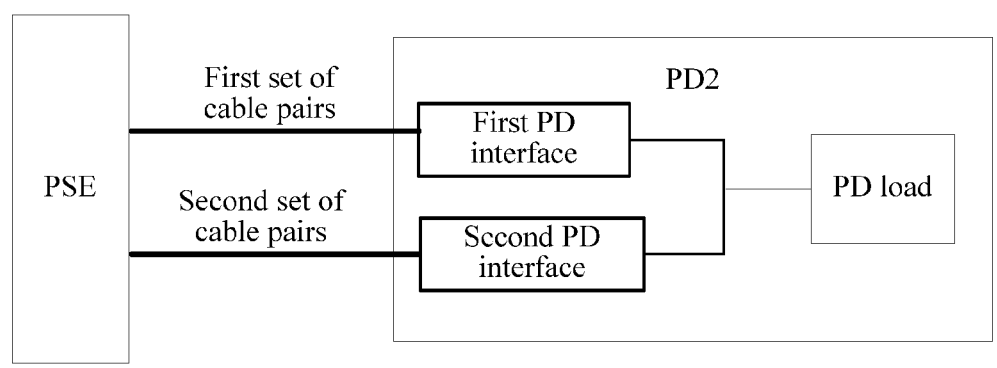
FIG. 2 is a schematic diagram 2 of a PoE scenario according to an embodiment of the present disclosure.

Referring to FIG. 2, FIG. 2 is a schematic diagram 2 of a PoE scenario according to an embodiment of the present disclosure. A PD 2 is connected to PSE using a standard Ethernet twisted pair. The PD 2 includes two PD interfaces, a first PD interface and a second PD interface. A first set of cable pairs of the standard Ethernet twisted pair is connected to the first PD interface, and a second set of cable pairs of the standard Ethernet twisted pair is connected to the second PD interface. The PD 2 includes only one PD load, and the PD load is connected to both the first PD interface and the second PD interface.

Figure 3:
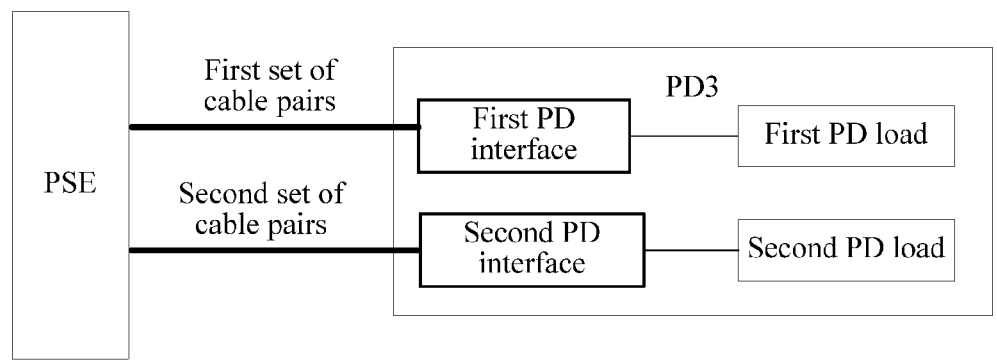
FIG. 3 is a schematic diagram 3 of a PoE scenario according to an embodiment of the present disclosure.

Referring to FIG. 3, FIG. 3 is a schematic diagram 3 of a PoE scenario according to an embodiment of the present disclosure. A PD 3 is connected to PSE using a standard Ethernet twisted pair. The PD 3 includes two PD interfaces, a first PD interface and a second PD interface. A first set of cable pairs of the standard Ethernet twisted pair is connected to the first PD interface, and a second set of cable pairs of the standard Ethernet twisted pair is connected to the second PD interface. The PD 3 includes two PD loads, a first PD load and a second PD load, where the first PD load is connected to the first PD interface and obtains power from the first PD interface, and the second PD load is connected to the second PD interface and obtains power from the second PD interface.

Figure 4:
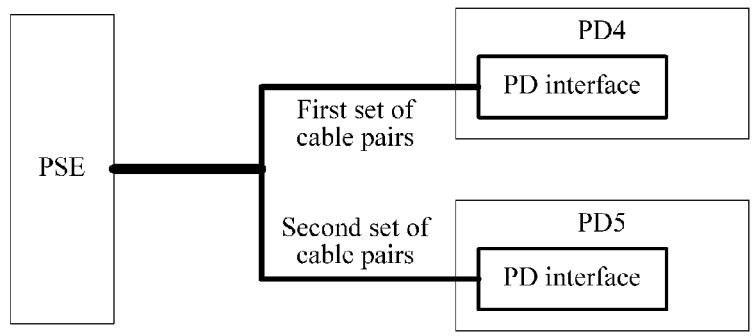
FIG. 4 is a schematic diagram 4 of a PoE scenario according to an embodiment of the present disclosure.

Referring to FIG. 4, FIG. 4 is a schematic diagram 4 of a PoE scenario according to an embodiment of the present disclosure. A PD 4 and a PD 5 are connected to PSE using a Y-type Ethernet twisted pair. The PD 4 is connected to the PSE using a first set of cable pairs of the Y-type Ethernet twisted pair, and the PD 5 is connected to the PSE using a second set of cable pairs of the Y-type Ethernet twisted pair.

Figure 5:
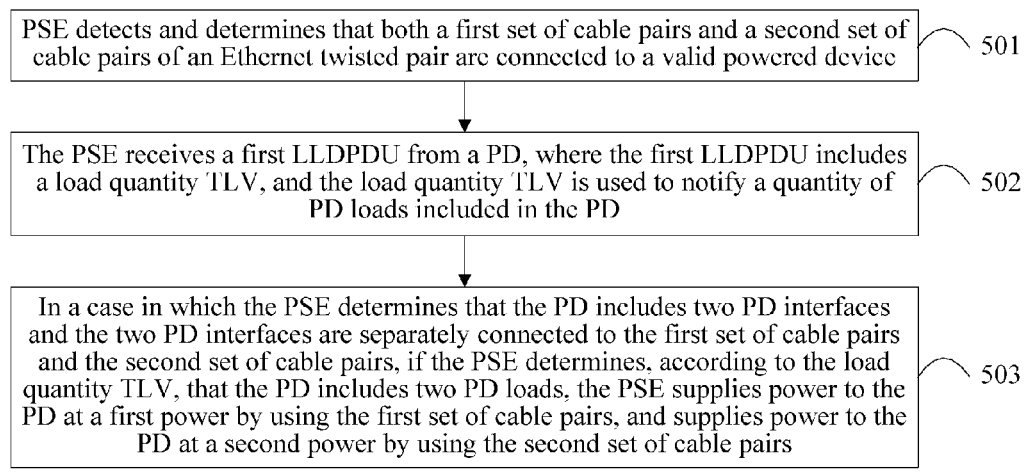
FIG. 5 is a schematic flowchart of a PoE method according to an embodiment of the present disclosure.

Referring to FIG. 5, an embodiment of the present disclosure provides a PoE method, including the following steps.

Step 501: PSE detects and determines that both a first set of cable pairs and a second set of cable pairs of an Ethernet twisted pair are connected to a valid powered device.

The PSE supports supplying power using four cable pairs.

The PSE sends a first detection voltage or a first detection current to a peer end along the first set of cable pairs, and obtains a first impedance, sends a second detection voltage or a second detection current to the peer end along the second set of cable pairs in the Ethernet twisted pair, and obtains a second impedance, and if both the first impedance and the second impedance fall within a preset range, determines that both the first set of cable pairs and the second set of cable pairs are connected to a valid powered device.

Step 502: The PSE receives a first LLDPDU from a PD, where the first LLDPDU includes a load quantity TLV, and the load quantity TLV is used to notify a quantity of PD loads included in the PD.

The PD is connected to the PSE using the Ethernet twisted pair.

Step 503: In a case in which the PSE determines that the PD includes two PD interfaces and the two PD interfaces are separately connected to the first set of cable pairs and the second set of cable pairs, if the PSE determines, according to the load quantity TLV, that the PD includes two PD loads, the PSE supplies power to the PD at a first power using the first set of cable pairs, and supplies power to the PD at a second power using the second set of cable pairs.

The first power and the second power are independent of each other.

Supplying power at the first power means that an allocated power is the first power.

In a case in which the PSE determines that the PD includes two PD interfaces, for example, a first PD interface and a second PD interface, and the two PD interfaces are separately connected to the first set of cable pairs and the second set of cable pairs, for example, the first PD interface is connected to the first set of cable pairs, and the second PD interface is connected to the second set of cable pairs, if the PSE determines, according to the load quantity TLV, that the PD includes two PD loads, for example, a first PD load and a second PD load, the PSE supplies power to the first PD load at the first power using the first set of cable pairs, and supplies power to the second PD load at the second power using the second set of cable pairs, where the first PD load is connected to the first PD interface and obtains power from the first PD interface, and the second PD load is connected to the second PD interface and obtains power from the second PD interface. if the PSE determines, according to the load quantity TLV, that the PD includes only one PD load, the PSE supplies power to the PD according to power requirement information of the PD, where the PD load is connected to both the first PD interface and the second PD interface.

In a case in which the PD includes two PD interfaces, the PD may include one PD load or two PD loads.

However, the PSE cannot determine, through detection at a physical layer, whether the PD includes one PD load (the scenario shown in FIG. 2) or two PD loads (the scenario shown in FIG. 3). In this embodiment, the PSE determines, according to the load quantity TLV included in the first LLDPDU from the PD, whether the PD includes one PD load or two PD loads.

For a scenario in which the PSE supports supplying power using four cable pairs, according to the PoE method provided in this embodiment of the present disclosure, one load quantity TLV is added by extending the LLDP, and is added to the LLDPDU that is sent by the PD to the PSE, to notify the PSE of a quantity of PD loads included in the PD.

According to the PoE method provided in this embodiment of the present disclosure, PSE detects and determines that both a first set of cable pairs and a second set of cable pairs of an Ethernet twisted pair are connected to a valid powered device, determines that a PD receives power from both the first set of cable pairs and the second set of cable pairs, and in a case in which the PD includes two PD interfaces, determines, according to a load quantity TLV, whether the PD includes one PD load or two PD loads such that a design type of the PD is determined. When it is determined that the PD includes two PD loads, the PSE separately supplies, using the first set of cable pairs and the second set of cable pairs, power to the two PD loads at powers that are independent of each other. Therefore, it is ensured that power can be supplied to a PD correctly and effectively.

Figure 6:
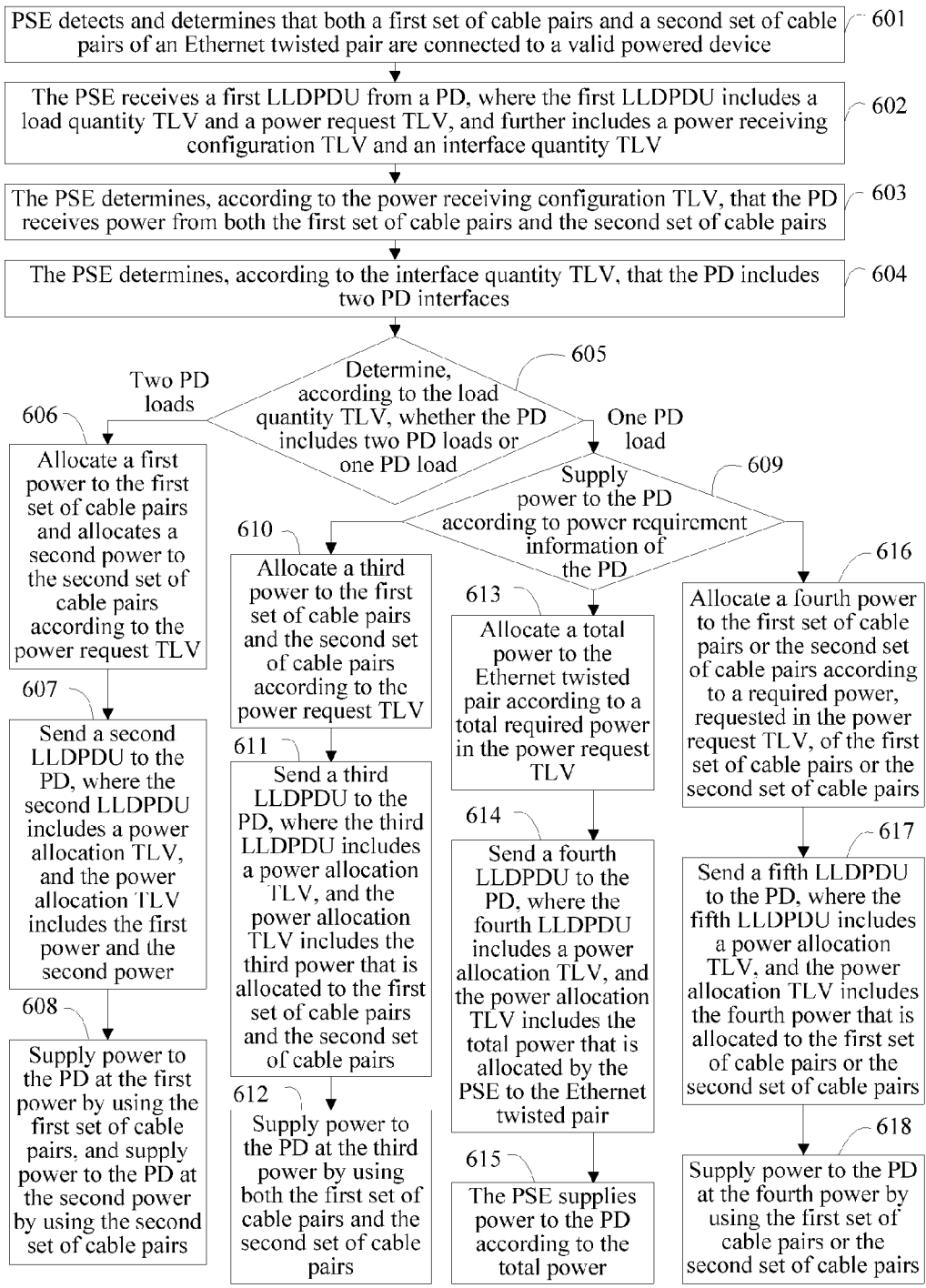
FIG. 6 is a schematic flowchart of another PoE method according to an embodiment of the present disclosure.

With reference to the method shown in FIG. 5, in a case in which the PSE detects and determines that both the first set of cable pairs and the second set of cable pairs of the Ethernet twisted pair are connected to the valid powered device, as shown in FIG. 6, an embodiment of the present disclosure provides another PoE method, including the following steps.

Step 601: PSE detects and determines that both a first set of cable pairs and a second set of cable pairs of an Ethernet twisted pair are connected to a valid powered device.

The PSE supports supplying power using four cable pairs.

In an implementation manner, the PSE sends a first detection voltage to a peer end along the first set of cable pairs in the Ethernet twisted pair, and obtains the first impedance according to the first detection voltage and a current that is detected from the first set of cable pairs, sends a second detection voltage to the peer end along the second set of cable pairs in the Ethernet twisted pair, and obtains a second impedance according to the second detection voltage and a current that is detected from the second set of cable pairs.

In another implementation manner, the PSE sends a first detection current to a peer end along the first set of cable pairs in the Ethernet twisted pair, and obtains a first impedance according to the first detection current and a voltage that is detected from the first set of cable pairs, sends a second detection current to the peer end along the second set of cable pairs in the Ethernet twisted pair, and obtains a second impedance according to the second detection voltage and a voltage that is detected from the second set of cable pairs.

The PSE determines, according to the first impedance and the second impedance, whether both the first set of cable pairs and the second set of cable pairs are connected to a valid powered device, and if the first impedance falls within a preset range and the second impedance falls beyond the preset range, the PSE determines that the first set of cable pairs is connected to a valid powered device, and powers on only the first set of cable pairs at a default power. In this case, power negotiation and power supply can be subsequently performed according to a conventional manner. This process ends, or if the second impedance falls within a preset range and the first impedance falls beyond the preset range, the PSE determines that the second set of cable pairs is connected to the valid powered device, and powers on the second set of cable pairs only at a default power. In this case, power negotiation and power supply can be subsequently performed according to a conventional manner. This process ends, or if both the first impedance and the second impedance fall within a preset range, the PSE determines that both the first set of cable pairs and second set of cable pairs are connected to a valid powered device, and may separately power on the first set of cable pairs and the second set of cable pairs at a default power.

The default power is usually at level 0, and when the default power is at level 0, the PSE provides a minimum power. Certainly, the default power may be defined as another value as required.

In an application, if a status of PD connection at a peer end needs to be determined according to a resistance value in the first impedance, a capacitance value in the first impedance, a resistance value in the second impedance, and a capacitance value in the second impedance, the preset range includes a resistance value range and a capacitance value range.

In an application, the status of PD connection at the peer end may be determined only according to the resistance value in the first impedance and the resistance value in the second impedance, and in this case, the preset range includes only the resistance value range.

Step 602: The PSE receives a first LLDPDU from a PD, where the first LLDPDU includes a load quantity TLV and a power request TLV, and further includes a power receiving configuration TLV and an interface quantity TLV.

The PD is connected to the PSE using the Ethernet twisted pair.

The load quantity TLV is used to notify a quantity of PD loads included in the PD, and the quantity may be one or two.

The power request TLV is used to notify the PSE of power requirement information of the PD.

The interface quantity TLV is used to notify the PSE of a quantity of PD interfaces included in the PD, and the quantity may be one or two.

The power receiving configuration TLV is used to notify the PSE of a status of a configuration of receiving power by the PD from the Ethernet twisted pair, and the status includes any one of the following, receiving power from only the first set of cable pairs, receiving power from only the second set of cable pairs, and receiving power from both the first set of cable pairs and the second set of cable pairs.

Step 603: The PSE determines, according to the power receiving configuration TLV, that the PD receives power from both the first set of cable pairs and the second set of cable pairs.

The PSE determines, according to the power receiving configuration TLV, that a status of a configuration of receiving power by the PD, and if it is determined that the PD receives power from only the first set of cable pairs, the PSE determines that the Ethernet twisted pair is a Y-type Ethernet twisted pair, and the PD is connected to the PSE using only the first set of cable pairs in the Y-type Ethernet twisted pair, for example, the PD is the PD 4 shown in FIG. 4. The process ends, or if it is determined that the PD receives power from only the second set of cable pairs, the PSE determines that the Ethernet twisted pair is a Y-type Ethernet twisted pair, and the PD is connected to the PSE using only the second set of cable pairs in the Y-type Ethernet twisted pair, for example, the PD is the PD 5 shown in FIG. 4. The process ends, or if it is determined that the PD receives power from both the first set of cable pairs and the second set of cable pairs, the PSE determines that the Ethernet twisted pair is a standard-type Ethernet twisted pair, and the PD is connected to the PSE using both the first set of cable pairs and the second set of cable pairs that are in the standard-type Ethernet twisted pair, as shown in any one of FIG. 1 to FIG. 3. Proceed to step 604.

Step 604: The PSE determines, according to the interface quantity TLV, that the PD includes two PD interfaces.

Furthermore, in a case in which it is determined that the PD receives power from both the first set of cable pairs and the second set of cable pairs, the PSE determines, according to the interface quantity TLV, whether the PD includes one PD interface or two PD interfaces, and if it is determined, according to the interface quantity TLV, that the PD includes only one PD interface, it indicates that the PD interface is connected to both the first set of cable pairs and the second set of cable pairs, as shown in FIG. 1. The PSE may perform power negotiation with the PD and supply power to the PD in a conventional manner. The process ends, or if it is determined, according to the interface quantity TLV, that the PD includes two PD interfaces, it indicates that the two PD interfaces are separately connected to the first set of cable pairs and the second set of cable pairs. For example, the two PD interfaces is a first PD interface and a second PD interface, the first PD interface is connected to the first set of cable pairs, and the second PD interface is connected to the second set of cable pairs, as shown in FIG. 2 or FIG. 3. Proceed to step 605.

Step 605: The PSE determines, according to the load quantity TLV, whether the PD includes two PD loads or includes only one PD load.

If the PSE determines, according to the load quantity TLV, that the PD includes two PD loads, for example, a first PD load and a second PD load, where the first PD load is connected to the first PD interface and obtains power from the first PD interface, and the second PD load is connected to the second PD interface and obtains power from the second PD interface, proceed to step 606 to step 608, or if the PSE determines, according to the load quantity TLV, that the PD includes only one PD load, and the PD load is connected to both the first PD interface and the second PD interface, proceed to step 609.

Step 606: The PSE allocates a first power to the first set of cable pairs and allocates a second power to the second set of cable pairs according to the power request TLV.

The power request TLV includes a first required power of the first set of cable pairs and a second required power of the second set of cable pairs that are requested from the PSE.

The first power and the second power are independent of each other, and the first power and the second power may be the same, or may be different.

The first power is usually less than or equal to the first required power in the power request TLV. The second power is usually less than or equal to the second required power in the power request TLV.

Step 607: The PSE sends a second LLDPDU to the PD, where the second LLDPDU includes a power allocation TLV, and the power allocation TLV includes the first power that is allocated by the PSE to the first set of cable pairs and the second power that is allocated to the second set of cable pairs.

Step 608: The PSE supplies power to the PD at the first power using the first set of cable pairs, and supplies power to the PD at the second power using the second set of cable pairs.

Further, the PSE supplies power to the first PD load at the first power using the first set of cable pairs, and supplies power to the second PD load at the second power using the second set of cable pairs.

Step 609: The PSE supplies power to the PD according to power requirement information of the PD.

Furthermore, that the PSE acquires the power requirement information of the PD according to the power request TLV, negotiates a supply power with the PD according to the power requirement information of the PD, and supplies power to the PD includes, if the power request TLV includes the first required power of the first set of cable pairs and the second required power of the second set of cable pairs, step 610 to step 612 are performed, or if the power request TLV includes a total required power of the Ethernet twisted pair, step 613 to step 615 are performed, or if the power request TLV includes a required power of the first set of cable pairs or the second set of cable pairs, step 616 to step 618 are performed.

Step 610: The PSE allocates a third power to the first set of cable pairs and the second set of cable pairs according to the first required power and the second required power that are in the power request TLV.

Furthermore, the PSE determines whether the first required power and the second required power that are requested in the power request TLV are the same, and if the first required power and the second required power that are in the power request TLV are the same, the PSE allocates the third power to the first set of cable pairs and also allocates the third power to the second set of cable pairs according to the first required power or the second required power in the power request TLV, or if the first required power and the second required power that are in the power request TLV are different, the PSE allocates the third power to the first set of cable pairs and the second set of cable pairs according to a smaller required power of the first required power and the second required power.

The third power is usually less than or equal to the first required power and the second required power, that is, the third power must be less than or equal to both the first required power and the second required power.

Step 611: The PSE sends a third LLDPDU to the PD, where the third LLDPDU includes a power allocation TLV, and the power allocation TLV includes the third power that is allocated by the PSE to the first set of cable pairs and the third power that is allocated to the second set of cable pairs.

Optionally, if the first required power and the second required power that are in the power request TLV are different, the third LLDPDU further includes a power request error indication, which is used to indicate, to the PD, an error of a required power requested in the power request TLV.

Step 612: The PSE supplies power to the PD at the third power using both the first set of cable pairs and the second set of cable pairs.

Furthermore, the PSE supplies power to the PD load at the third power using the first set of cable pairs, and supplies power to the PD load at the third power using the second set of cable pairs. In this way, the PD load may obtain power using both the first set of cable pairs and the second set of cable pairs.

Step 613: The PSE allocates a total power to the Ethernet twisted pair according to the total required power in the power request TLV.

The total power is usually less than or equal to the total required power in the power request TLV.

Step 614: The PSE sends a fourth LLDPDU to the PD, where the fourth LLDPDU includes a power allocation TLV, and the power allocation TLV includes the total power that is allocated by the PSE to the Ethernet twisted pair.

Step 615: The PSE supplies power to the PD according to the total power.

Furthermore, if the total required power in the power request TLV is not greater than a given power value, the PSE supplies power to the PD at the total power using only the first set of cable pairs, or using only the second set of cable pairs, or using both the first set of cable pairs and the second set of cable pairs, or if the total required power in the power request TLV is greater than a given power value, the PSE supplies power to the PD at the total power using both the first set of cable pairs and the second set of cable pairs.

When power is supplied to the PD at the total power using both the first set of cable pairs and the second set of cable pairs, each of a supply power of the first set of cable pairs and a supply power of the second set of cable pairs is half the total power.

The given power value is a maximum power at level 4, that is, a maximum power, 30 W, that can be provided by the PSE. Certainly, the given power value may be another value according to an actual case.

Step 616: The PSE allocates a fourth power to the first set of cable pairs or the second set of cable pairs according to a required power, requested in the power request TLV, of the first set of cable pairs or the second set of cable pairs.

In this scenario, it indicates that a power required by the PD is less than the maximum power at level 4, as long as power is obtained using the first set of cable pairs or the second set of cable pairs.

Step 617: The PSE sends a fifth LLDPDU to the PD, where the fifth LLDPDU includes a power allocation TLV, and the power allocation TLV includes the fourth power that is allocated by the PSE to the first set of cable pairs or the second set of cable pairs.

Step 618: The PSE supplies power to the PD at the fourth power using the first set of cable pairs or the second set of cable pairs.

For a scenario in which the PSE supports supplying power using four cable pairs, according to the PoE method provided in this embodiment of the present disclosure, the LLDP is further extended, a status of a configuration of receiving power by the PD and a quantity of PD interfaces are notified to the PSE using the power receiving configuration TLV and the interface quantity TLV that are carried in an LLDPDU, and the supply powers of the first set of cable pairs and the second set of cable pairs are negotiated with the PSE using the power request TLV that are carried in an LLDPDU.

According to the PoE method provided in this method of the present disclosure, in a case in which PSE determines, through physical detection, that both a first set of cable pairs and a second set of cable pairs are connected to a valid powered device, the PSE determines, according to a power receiving configuration TLV in a first LLDPDU, whether a PD receives power from both the first set of cable pairs and the second set of cable pairs. In a case in which it is determined that the PD receives power from both the first set of cable pairs and the second set of cable pairs, the PSE determines, according to an interface quantity TLV, whether the PD includes two PD interfaces. In a case in which it is determined that the PD includes two PD interfaces, the PSE determines, according to a load quantity TLV, whether the PD includes one PD load or two PD loads, and when it is determined that the PD includes two PD loads, the PSE separately supplies, using the first set of cable pairs and the second set of cable pairs, power to the two PD loads at powers that are independent of each other, and when the PD includes only one PD load, the PSE supplies power to the PD load using the first set of cable pairs and/or the second set of cable pairs according to power requirement information of the PD. Therefore, it is ensured that power can be supplied to a PD correctly and effectively.

Figure 7:
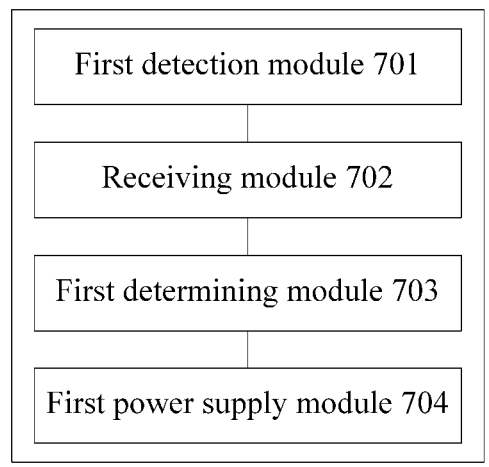
FIG. 7 is a schematic structural diagram of PSE according to an embodiment of the present disclosure.

An embodiment of the present disclosure provides PSE. As shown in FIG. 7, the PSE includes a first detection module 701, a receiving module 702, a first determining module 703, and a first power supply module 704. The PSE supports supplying power using four cable pairs.

The first detection module 701 is configured to detect and determine whether both a first set of cable pairs and a second set of cable pairs of an Ethernet twisted pair are connected to a valid powered device.

Furthermore, the first detection module 701 is configured to send a first detection voltage or a first detection current to a peer end along the first set of cable pairs, and obtain a first impedance, send a second detection voltage or a second detection current to the peer end along the second set of cable pairs in the Ethernet twisted pair, and obtain a second impedance, and determine, according to the first impedance and the second impedance, whether both the first set of cable pairs and the second set of cable pairs are connected to a valid powered device. Furthermore, the first detection module 701 is configured to send the first detection voltage to the peer end along the first set of cable pairs in the Ethernet twisted pair, and obtain the first impedance according to the first detection voltage and a current that is detected from the first set of cable pairs, and send the second detection voltage to the peer end along the second set of cable pairs in the Ethernet twisted pair, and obtain the second impedance according to the second detection voltage and a current that is detected from the second set of cable pairs. Alternatively, the first detection module 701 is configured to send the first detection current to the peer end along the first set of cable pairs in the Ethernet twisted pair, and obtain the first impedance according to the first detection current and a voltage that is detected from the first set of cable pairs, and send the second detection current to the peer end along the second set of cable pairs in the Ethernet twisted pair, and obtain the second impedance according to the second detection voltage and a voltage that is detected from the second set of cable pairs.

If the first impedance falls within a preset range and the second impedance falls beyond the preset range, it is determined that the first set of cable pairs is connected to a valid powered device. The PSE may power on the first set of cable pairs only at a default power.

If the second impedance falls within the preset range and the first impedance falls beyond the preset range, it is determined that the second set of cable pairs is connected to a valid powered device. The PSE may power on the second set of cable pairs only at a default power.

If both the first impedance and the second impedance fall within the preset range, it is determined that both the first set of cable pairs and the second set of cable pairs are connected to the valid powered device. The PSE may separately power on both the first set of cable pairs and the second set of cable pairs at a default power.

The default power is usually at level 0, and when the default power is at level 0, the PSE provides a minimum power.

In an actual application, if a status of a connection by a PD of a peer end needs to be determined according to a resistance value in the first impedance, a capacitance value in the first impedance, a resistance value in the second impedance, and a capacitance value in the second impedance, the preset range includes a resistance value range and a capacitance value range.

In an actual application, the status of a connection by the PD of the peer end may alternatively be determined according to only the resistance value in the first impedance and the resistance value in the second impedance, and in this case, the preset range includes only the resistance value range.

The receiving module 702 is configured to receive a first LLDPDU from a PD, where the first LLDPDU includes a load quantity TLV, and the load quantity TLV is used to notify a quantity of PD loads included in the PD; and the PD is connected to the PSE using the Ethernet twisted pair.

The first determining module 703 is configured to, in a case in which the PSE determines that the PD receives power from both the first set of cable pairs and the second set of cable pairs, and the PD includes two PD interfaces, determine, according to the load quantity TLV, whether the PD includes two PD loads or one PD load.

The first power supply module 704 is configured to, when the first determining module 703 determines that the PD includes two PD loads, supply power to the PD at a first power using the first set of cable pairs, and supply power to the PD at a second power using the second set of cable pairs, where the first power and the second power are independent of each other.

Optionally, the first LLDPDU further includes a power request TLV, and the power request TLV is used to notify the PSE of power requirement information of the PD, where the power requirement information includes any one of the following: a required power of the first set of cable pairs, a required power of the second set of cable pairs, a required power of the first set of cable pairs and a required power of the second set of cable pairs, and a total required power of the Ethernet twisted pair.

The first power supply module 704 is further configured to allocate the first power to the first set of cable pairs and allocate the second power to the second set of cable pairs according to a first required power of the first set of cable pairs and a second required power of the second set of cable pairs that are in the power request TLV, and send a second LLDPDU to the PD, where the second LLDPDU includes a power allocation TLV, and the power allocation TLV includes the first power and the second power. The power request TLV includes the first required power of the first set of cable pairs and the second required power of the second set of cable pairs.

Further, the PSE may further include a second power supply module 705 configured to, when the first determining module 703 determines that the PD includes only one PD load, supply power to the PD according to power requirement information of the PD.

In a first possible case, the power request TLV includes the first required power of the first set of cable pairs and the second required power of the second set of cable pairs, and correspondingly, the second power supply module 705 is further configured to allocate a third power to the first set of cable pairs and the second set of cable pairs according to the first required power and the second required power that are in the power request TLV, send a third LLDPDU to the PD, where the third LLDPDU includes a power allocation TLV, and the power allocation TLV includes the third power that is allocated by the PSE to the first set of cable pairs and the second set of cable pairs, and supply power to the PD at the third power using both the first set of cable pairs and the second set of cable pairs such that the PD load obtains power using both the first set of cable pairs and the second set of cable pairs.

The second power supply module is further configured to determine whether the first required power and the second required power that are in the power request TLV are the same, and if the first required power and the second required power that are in the power request TLV are the same, allocate the third power to the first set of cable pairs and also allocate the third power to the second set of cable pairs according to the first required power or the second required power in the power request TLV, or if the first required power and the second required power that are in the power request TLV are different, allocate the third power to the first set of cable pairs and the second set of cable pairs according to a smaller required power of the first required power and the second required power.

The third power is usually less than or equal to the first required power and the second required power.

Optionally, if the first required power and the second required power that are in the power request TLV are different, the third LLDPDU further includes a power request error indication, which is used to indicate, to the PD, an error of a required power requested in the power request TLV.

In a second possible case, the power request TLV includes a total required power of the Ethernet twisted pair, and correspondingly, the second power supply module 705 is further configured to allocate a total power to the Ethernet twisted pair according to the total required power in the power request TLV, send a fourth LLDPDU to the PD, where the fourth LLDPDU includes a power allocation TLV, and the power allocation TLV includes the total power that is allocated by the PSE to the Ethernet twisted pair, and if the total required power in the power request TLV is not greater than a given power value, supply power to the PD at the total power using only the first set of cable pairs, or using only the second set of cable pairs, or using both the first set of cable pairs and the second set of cable pairs, or if the total required power in the power request TLV is greater than a given power value, supply power to the PD at the total power using both the first set of cable pairs and the second set of cable pairs, where when power is supplied to the PD at the total power using both the first set of cable pairs and the second set of cable pairs, each of a supply power of the first set of cable pairs and a supply power of the second set of cable pairs is half the total power.

The total power is usually less than or equal to the total required power in the power request TLV.

The given power value is a maximum power at level 4, that is, a maximum power, 30 W, that can be provided by the PSE. Certainly, the given power value may be another value according to an actual case.

In a third possible case, the power request TLV includes a required power of the first set of cable pairs or the second set of cable pairs, and correspondingly, the second power supply module 705 is further configured to allocate a fourth power to the first set of cable pairs or the second set of cable pairs according to the required power of the first set of cable pairs or the second set of cable pairs in the power request TLV, send a fifth LLDPDU to the PD, where the fifth LLDPDU includes a power allocation TLV, and the power allocation TLV includes the fourth power that is allocated by the PSE to the first set of cable pairs or the second set of cable pairs, and supply power to the PD at the fourth power using the first set of cable pairs or the second set of cable pairs such that the PD load obtains power using the first set of cable pairs or the second set of cable pairs.

In this case, it indicates that a power required by the PD is less than a maximum power at level 4, as long as power is obtained using the first set of cable pairs or the second set of cable pairs.

Further, the first LLDPDU may further include a power receiving configuration TLV. The power receiving configuration TLV is used to notify the PSE of a status of a configuration of receiving power by the PD from the Ethernet twisted pair, and the status includes any one of the following: receiving power from only the first set of cable pairs, receiving power from only the second set of cable pairs, and receiving power from both the first set of cable pairs and the second set of cable pairs.

The PSE may further include a second determining module configured to determine, according to the power receiving configuration TLV, whether the PD receives power from both the first set of cable pairs and the second set of cable pairs, that is, determine a status of a configuration of receiving power by the PD. If it is determined, according to the power receiving configuration TLV, that the PD receives power from only the first set of cable pairs, it may be determined that the Ethernet twisted pair is a Y-type Ethernet twisted pair, and the PD is connected to the PSE using only the first set of cable pairs in the Y-type Ethernet twisted pair, for example, the PD is the PD 4 in FIG. 4, or if it is determined, according to the power receiving configuration TLV, that the PD receives power from only the second set of cable pairs, it may be determined that the Ethernet twisted pair is a Y-type Ethernet twisted pair, and the PD is connected to the PSE using only the second set of cable pairs in the Y-type Ethernet twisted pair, for example, the PD is the PD 5 in FIG. 4, or if it is determined, according to the power receiving configuration TLV, that the PD receives power from both the first set of cable pairs and the second set of cable pairs, it may be determined that the Ethernet twisted pair is a standard-type Ethernet twisted pair, and the PD is connected to the PSE using both the first set of cable pairs and the second set of cable pairs that are in the standard-type Ethernet twisted pair, as shown in any one of FIG. 1 to FIG. 3.

Optionally, the first LLDPDU further includes an interface quantity TLV, the interface quantity TLV is used to notify the PSE of a quantity of PD interfaces included in the PD, and the quantity may be one or two. The PSE may further include a third determining module configured to, when the second determining module determines that the PD receives power from both the first set of cable pairs and the second set of cable pairs, determine, according to the interface quantity TLV, whether the PD includes two PD interfaces, that is, determine whether the PD includes one PD interface or two PD interfaces. If it is determined, according to the interface quantity TLV, that the PD includes only one PD interface, it indicates that the PD interface is connected to both the first set of cable pairs and the second set of cable pairs, as shown in FIG. 1. If it is determined, according to the interface quantity TLV, that the PD includes two PD interfaces, it indicates that the two PD interfaces are separately connected to the first set of cable pairs and the second set of cable pairs. For example, the two PD interfaces are a first PD interface and a second PD interface, the first PD interface is connected to the first set of cable pairs, and the second PD interface is connected to the second set of cable pairs, as shown in FIG. 2 or FIG. 3.

According to the PSE provided in this embodiment of the present disclosure, the first detection module 701 detects and determines that both a first set of cable pairs and a second set of cable pairs of an Ethernet twisted pair are connected to a valid powered device. In a case in which the first determining module 703 determines that a PD receives power from both the first set of cable pairs and the second set of cable pairs, and the PD includes two PD interfaces, the first determining module 703 determines, according to a load quantity TLV in a first LLDPDU received by the receiving module 702, whether the PD includes one PD load or two PD loads such that a design type of the PD is determined. When the first determining module 703 determines that the PD includes two PD loads, the first power supply module 704 separately supplies, using the first set of cable pairs and the second set of cable pairs, power to the two PD loads at powers that are independent of each other. Therefore, it is ensured that power can be supplied to a PD correctly and effectively.

Figure 8:
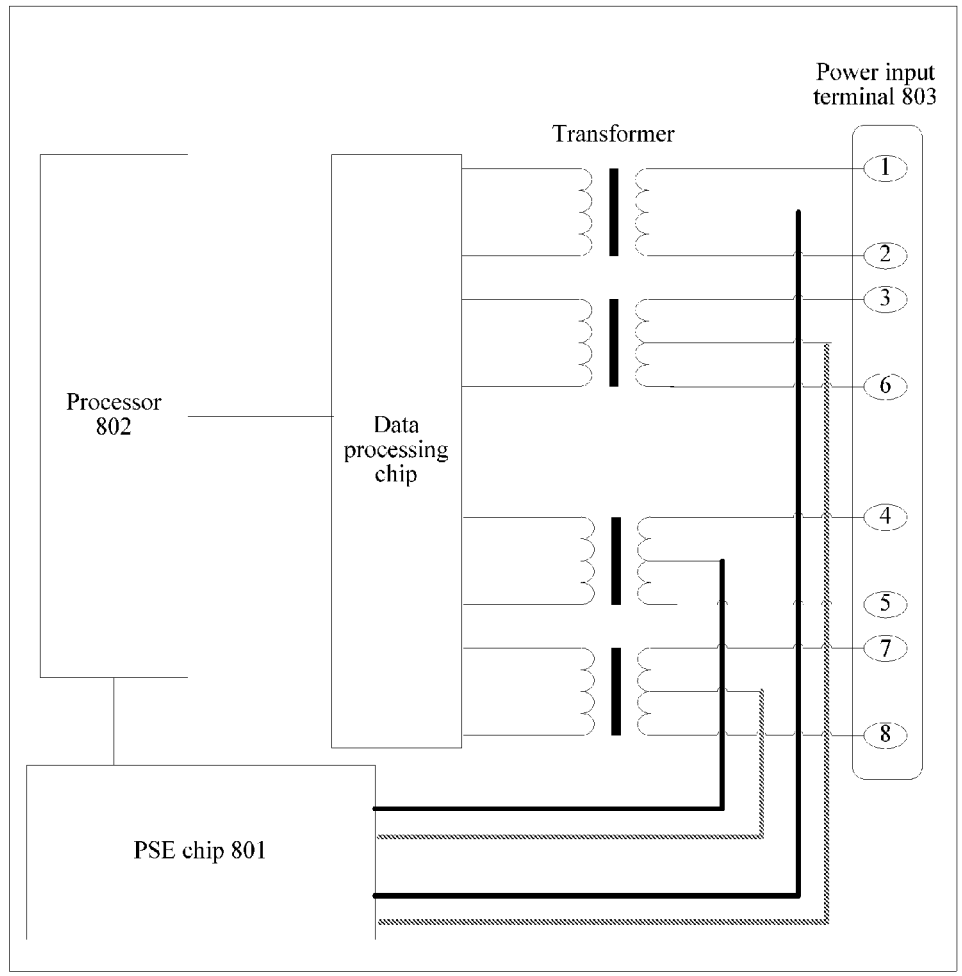
FIG. 8 is another schematic structural diagram of PSE according to an embodiment of the present disclosure.

An embodiment of the present disclosure provides another PSE. As shown in FIG. 8, the PSE includes a PSE chip 801, a processor 802, and a power input terminal 803.

The PSE supports supplying power using four pairs of cables.

The power input terminal 803 is an 8P8C modular connector, which is also referred to as an RJ-45 connector.

The PSE chip 801 is configured to detect whether both a first set of cable pairs and a second set of cable pairs of an Ethernet twisted pair are connected to a valid powered device.

Further, the PSE chip 801 sends a first detection voltage or a first detection current to a peer end along the first set of cable pairs in the Ethernet twisted pair, and obtains a first impedance, sends a second detection voltage or a second detection current to the peer end along the second set of cable pairs in the Ethernet twisted pair, and obtains a second impedance, and if both the first impedance and the second impedance fall within a preset range, determines that both the first set of cable pairs and the second set of cable pairs are connected to a valid powered device.

In a possible implementation manner, the PSE chip 801 sends the first detection voltage to the peer end along the first set of cable pairs in the Ethernet twisted pair, and obtains the first impedance according to the first detection voltage and a current that is detected from the first set of cable pairs, sends the second detection voltage to the peer end along the second set of cable pairs in the Ethernet twisted pair, and obtains the second impedance according to the second detection voltage and a current that is detected from the second set of cable pairs.

In another possible implementation manner, the PSE chip 801 sends the first detection current to the peer end along the first set of cable pairs in the Ethernet twisted pair, and obtains the first impedance according to the first detection current and a voltage that is detected from the first set of cable pairs, sends the second detection current to the peer end along the second set of cable pairs in the Ethernet twisted pair, and obtains the second impedance according to the second detection current and a voltage that is detected from the second set of cable pairs.

The processor 802 is configured to receive a first LLDPDU from a PD, where the first LLDPDU includes a load quantity type-length-value TLV, and the load quantity TLV is used to notify a quantity of PD loads included in the PD. In a case in which the PD receives power from both the first set of cable pairs and the second set of cable pairs, and the PD includes two PD interfaces, determine, according to the load quantity TLV, whether the PD includes two PD loads, and in a case in which the PD includes two PD loads, control the PSE chip 801 to supply power to the PD at a first power using the first set of cable pairs, and supply power to the PD at a second power using the second set of cable pairs, where the first power and the second power are independent of each other.

Furthermore, as shown in FIG. 8, two ends of one inductor of a transformer are connected to two contacts in an 8P8C modular connector of an Ethernet twisted pair, and two ends of another inductor of the transformer are connected to a data processing chip in order to receive a data signal. The processor 802 receives the first LLDPDU from the power input terminal 803 using the data processing chip. The PD is connected to the power input terminal 803 using the Ethernet twisted pair in order to be connected to the PSE.

Optionally, the first LLDPDU further includes a power request TLV, and the power request TLV is used to notify the Ethernet power sourcing equipment of power requirement information of the PD, and the power requirement information includes any one of the following, a required power of the first set of cable pairs, a required power of the second set of cable pairs, a required power of the first set of cable pairs and a required power of the second set of cable pairs, and a total required power of the Ethernet twisted pair.

The processor 802 is further configured to, when it is determined that the PD includes two PD loads, allocate the first power to the first set of cable pairs and allocate the second power to the second set of cable pairs according to the power request TLV, where the power request TLV includes a first required power of the first set of cable pairs and a second required power of the second set of cable pairs, send a second LLDPDU to the PD, where the second LLDPDU includes a power allocation TLV, and the power allocation TLV includes the first power that is allocated to the first set of cable pairs and the second power that is allocated to the second set of cable pairs, and control the PSE chip 801 to supply power to the PD at the first power using the first set of cable pairs, and supply power to the PD at the second power using the second set of cable pairs.

Further, the processor 802 is configured to, in a case in which it is determined that the PD includes only one PD load, supply power to the PD according to power requirement information of the PD, which further includes the following several possible cases.

In a first possible case, the power request TLV includes the first required power of the first set of cable pairs and the second required power of the second set of cable pairs, and the processor 802 is further configured to allocate a third power to the first set of cable pairs and the second set of cable pairs according to the first required power and the second required power that are in the power request TLV, send a third LLDPDU to the PD, where the third LLDPDU includes a power allocation TLV, and the power allocation TLV includes the third power that is allocated to the first set of cable pairs and the second set of cable pairs, and control the PSE chip 801 to supply power to the PD at the third power using both the first set of cable pairs and the second set of cable pairs.

Optionally, the processor 802 is further configured to determine whether the first required power and the second required power that are in the power request TLV are the same, and if the first required power and the second required power that are in the power request TLV are the same, allocate the third power to the first set of cable pairs and also allocate the third power to the second set of cable pairs according to the first required power or the second required power in the power request TLV, or if the first required power and the second required power that are in the power request TLV are different, allocate the third power to the first set of cable pairs and the second set of cable pairs according to a smaller required power of the first required power and the second required power.

The third power is usually less than or equal to the first required power and the second required power.

Optionally, if the first required power and the second required power that are in the power request TLV are different, the third LLDPDU further includes a power request error indication, which is used to indicate, to the PD, an error of a required power requested in the power request TLV.

In a second possible case, the power request TLV includes a total required power of the Ethernet twisted pair, and the processor 802 is further configured to allocate a total power to the Ethernet twisted pair according to the total required power in the power request TLV, send a fourth LLDPDU to the PD, where the fourth LLDPDU includes a power allocation TLV, and the power allocation TLV includes the total power that is allocated to the Ethernet twisted pair, and if the total required power in the power request TLV is not greater than a given power value, control the PSE chip 801 to supply power to the PD at the total power using only the first set of cable pairs, or using only the second set of cable pairs, or using both the first set of cable pairs and the second set of cable pairs, or if the total required power in the power request TLV is greater than a given power value, control the PSE chip 801 to supply power to the PD at the total power using both the first set of cable pairs and the second set of cable pairs, where when power is supplied to the PD at the total power using both the first set of cable pairs and the second set of cable pairs, each of a supply power of the first set of cable pairs and a supply power of the second set of cable pairs is half the total power.

The total power is usually less than or equal to the total required power in the power request TLV.

The given power value is a maximum power at level 4, that is, a maximum power, 30 W, that can be provided by the PSE. Certainly, the given power value may be another value according to an actual case.

In a third possible case, the power request TLV includes a required power of the first set of cable pairs or the second set of cable pairs, and the processor 802 is further configured to allocate a fourth power to the first set of cable pairs or the second set of cable pairs according to the required power of the first set of cable pairs or the second set of cable pairs in the power request TLV, send a fifth LLDPDU to the PD, where the fifth LLDPDU includes a power allocation TLV, and the power allocation TLV includes the fourth power that is allocated to the first set of cable pairs or the second set of cable pairs, and control the PSE chip 801 to supply power to the PD at the fourth power using the first set of cable pairs or the second set of cable pairs.

The first LLDPDU may further include a power receiving configuration TLV, the power receiving configuration TLV is used to notify the PSE of a status of a configuration of receiving power by the PD from the Ethernet twisted pair, and the status includes any one of the following, receiving power from only the first set of cable pairs, receiving power from only the second set of cable pairs, and receiving power from both the first set of cable pairs and the second set of cable pairs.

The processor 802 is further configured to determine, according to the power receiving configuration TLV, whether the PD receives power from both the first set of cable pairs and the second set of cable pairs, that is, determine a status of a configuration of receiving power by the PD. If it is determined, according to the power receiving configuration TLV, that the PD receives power from only the first set of cable pairs, it is determined that the Ethernet twisted pair is a Y-type Ethernet twisted pair, and the PD is connected to the PSE using only the first set of cable pairs in the Y-type Ethernet twisted pair, for example, the PD is the PD 4 in FIG. 4, or if it is determined, according to the power receiving configuration TLV, that the PD receives power from only the second set of cable pairs, it is determined that the Ethernet twisted pair is a Y-type Ethernet twisted pair, and the PD is connected to the PSE using only the second set of cable pairs in the Y-type Ethernet twisted pair, for example, the PD is the PD 5 in FIG. 4, or if it is determined, according to the power receiving configuration TLV, that the PD receives power from both the first set of cable pairs and the second set of cable pairs, it is determined that the Ethernet twisted pair is a standard-type Ethernet twisted pair, and the PD is connected to the PSE using both the first set of cable pairs and the second set of cable pairs that are in the standard-type Ethernet twisted pair, as shown in any one of FIG. 1 to FIG. 3.

Further, the first LLDPDU may further include an interface quantity TLV, the interface quantity TLV is used to notify the PSE of a quantity of PD interfaces included in the PD, and the quantity may be one or two.

The processor 802 may be further configured to, when it is determined that the PD receives power from both the first set of cable pairs and the second set of cable pairs, determine, according to the interface quantity TLV, whether the PD includes two PD interfaces, that is, determine whether the PD includes one PD interface or two PD interfaces. If it is determined, according to the interface quantity TLV, that the PD includes only one PD interface, it indicates that the PD interface is connected to both the first set of cable pairs and the second set of cable pairs, as shown in FIG. 1. If it is determined, according to the interface quantity TLV, that the PD includes two PD interfaces, it indicates that the two PD interfaces are separately connected to the first set of cable pairs and the second set of cable pairs. For example, the two PD interfaces are a first PD interface and a second PD interface, the first PD interface is connected to the first set of cable pairs, and the second PD interface is connected to the second set of cable pairs, as shown in FIG. 2 or FIG. 3.

The processor 802 may be a general purpose processor, including a central processing unit (CPU), a network processor (NP), and the like, or may be a digital signal processor (DSP), an application-specific integrated circuit (ASIC), a field programmable gate array (FPGA), or another programmable logical device.

According to the PSE provided in this embodiment of the present disclosure, in a case in which the PSE chip 801 detects and determines that both a first set of cable pairs and a second set of cable pairs of an Ethernet twisted pair are connected to a valid powered device, if the processor 802 determines that a PD receives power from both the first set of cable pairs and the second set of cable pairs, and the PD includes two PD interfaces, the processor 802 determines, according to a load quantity TLV in a received first LLDPDU, whether the PD includes one PD load or two PD loads such that a design type of the PD is determined. When it is determined that the PD includes two PD loads, the processor 802 controls the PSE chip 801 to separately supply, using the first set of cable pairs and the second set of cable pairs, power to the two PD loads at powers that are independent of each other. Therefore, it is ensured that power can be supplied to a PD correctly and effectively.

Figure 9:
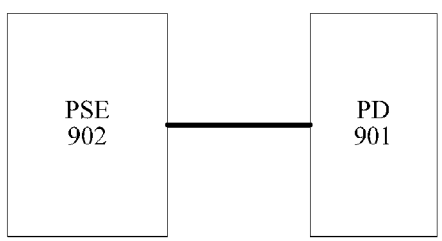
FIG. 9 is a schematic structural diagram of a PoE system according to an embodiment of the present disclosure.

An embodiment of the present disclosure provides a PoE system. As shown in FIG. 9, the system includes a PD 901 and PSE 902.

The PSE 902 supports supplying power using four pairs of cables, and the PD 901 is connected to the PSE 902 using an Ethernet twisted pair.

The PSE may be a network device, for example, a switch.

The PSE 902 is configured to detect and determine whether both a first set of cable pairs and a second set of cable pairs of the Ethernet twisted pair are connected to a valid powered device.

Further, the PSE 902 sends a first detection voltage or a first detection current to a peer end along the first set of cable pairs, and obtains a first impedance, sends a second detection voltage or a second detection current to the peer end along the second set of cable pairs in the Ethernet twisted pair, and obtains a second impedance, and if both the first impedance and the second impedance fall within a preset range, determines that both the first set of cable pairs and the second set of cable pairs are connected to a valid powered device.

The PSE 902 is further configured to receive a first LLDPDU from the PD 901, where the first LLDPDU includes a load quantity TLV, and the load quantity TLV is used to notify a quantity of PD loads included in the PD 901. In a case in which the PD 901 receives power from both the first set of cable pairs and the second set of cable pairs, and the PD 901 includes two PD interfaces, determine, according to the load quantity TLV, whether the PD 901 includes two PD loads, and if it is determined that the PD 901 includes two PD loads, supply power to the PD 901 at a first power using the first set of cable pairs, and supply power to the PD 901 at a second power using the second set of cable pairs, where the first power and the second power are independent of each other, or if it is determined that the PD

901 includes only one PD load, supply power to the PD 901 according to power requirement information of the PD 901.

The PD 901 is configured to send the first LLDPDU to the PSE 902.

Optionally, the first LLDPDU further includes a power request TLV, and the power request TLV is used to notify the PSE 902 of power requirement information of the PD 901, where the power requirement information includes any one of the following, a required power of the first set of cable pairs, a required power of the second set of cable pairs, a required power of the first set of cable pairs and a required power of the second set of cable pairs, and a total required power of the Ethernet twisted pair.

The PSE 902 is further configured to, when it is determined that the PD 901 includes two PD loads, allocate the first power to the first set of cable pairs and allocate the second power to the second set of cable pairs according to the power request TLV, where the power request TLV includes the first required power of the first set of cable pairs and the second required power of the second set of cable pairs, send a second LLDPDU to the PD 901, where the second LLDPDU includes a power allocation TLV, and the power allocation TLV includes the first power and the second power, and supply power to the PD 901 at the first power using the first set of cable pairs, and supply power to the PD 901 at the second power using the second set of cable pairs.

The PD 901 is further used to receive the second LLDPDU sent by the PSE 902.

When it is determined that the PD 901 includes only one PD load, the PSE 902 supplies power to the PD according to power requirement information of the PD, which further includes the following several possible cases:

In a first possible case, the power request TLV includes the first required power of the first set of cable pairs and the second required power of the second set of cable pairs, and the PSE 902 is further configured to allocate a third power to the first set of cable pairs and the second set of cable pairs according to the first required power and the second required power that are in the power request TLV, send a third LLDPDU to the PD 901, where the third LLDPDU includes a power allocation TLV, and the power allocation TLV includes the third power that is allocated by the PSE to the first set of cable pairs and the second set of cable pairs, and supply power to the PD 901 at the third power using both the first set of cable pairs and the second set of cable pairs such that the PD load obtains power using both the first set of cable pairs and the second set of cable pairs.

The PSE 902 is further configured to determine whether the first required power and the second required power that are in the power request TLV are the same, and if the first required power and the second required power that are in the power request TLV are the same, allocate the third power to the first set of cable pairs and also allocate the third power to the second set of cable pairs according to the first required power or the second required power in the power request TLV, or if the first required power and the second required power that are in the power request TLV are different, allocate the third power to the first set of cable pairs and the second set of cable pairs according to a smaller required power of the first required power and the second required power.

The third power is usually less than or equal to the first required power and the second required power.

Optionally, if the first required power and the second required power that are in the power request TLV are different, the third LLDPDU further includes a power request error indication, which is used to indicate, to the PD 901, an error of a required power requested in the power request TLV.

The PD 901 is further used to receive the third LLDPDU sent by the PSE 902.

In a second possible case, the power request TLV includes a total required power of the Ethernet twisted pair, and the PSE 902 is further configured to allocate a total power to the Ethernet twisted pair according to the total required power in the power request TLV, send a fourth LLDPDU to the PD 901, where the fourth LLDPDU includes a power allocation TLV, and the power allocation TLV includes the total power that is allocated by the PSE to the Ethernet twisted pair, and if the total required power in the power request TLV is not greater than a given power value, supply power to the PD 901 at the total power using only the first set of cable pairs, or using only the second set of cable pairs, or using both the first set of cable pairs and the second set of cable pairs, or if the total required power in the power request TLV is greater than a given power value, supply power to the PD 901 at the total power using both the first set of cable pairs and the second set of cable pairs.

When power is supplied to the PD 901 at the total power using both the first set of cable pairs and the second set of cable pairs, each of a supply power of the first set of cable pairs and a supply power of the second set of cable pairs is half the total power.

The total power is usually less than or equal to the total required power in the power request TLV.

The given power value is a maximum power at level 4, that is, a maximum power, 30 W, that can be provided by the PSE. Certainly, the given power value may be another value according to an actual case.

The PD 901 is further used to receive the fourth LLDPDU sent by the PSE 902.

In a third possible case, the power request TLV includes a required power of the first set of cable pairs or the second set of cable pairs, and the PSE 902 is further configured to allocate a fourth power to the first set of cable pairs or the second set of cable pairs according to the required power of the first set of cable pairs or the second set of cable pairs in the power request TLV, send a fifth LLDPDU to the PD 901, where the fifth LLDPDU includes a power allocation TLV, and the power allocation TLV includes the fourth power that is allocated by the PSE to the first set of cable pairs or the second set of cable pairs, and supply power to the PD 901 at the fourth power using the first set of cable pairs or the second set of cable pairs such that the PD load obtains power using the first set of cable pairs or the second set of cable pairs.

In this case, it indicates that a power required by the PD 901 is less than a maximum power at level 4, as long as power is obtained using the first set of cable pairs or the second set of cable pairs.

The first LLDPDU may further include a power receiving configuration TLV. The power receiving configuration TLV is used to notify the PSE 902 of a status of a configuration of receiving power by the PD 901 from the Ethernet twisted pair, and the status includes any one of the following, receiving power from only the first set of cable pairs, receiving power from only the second set of cable pairs, and receiving power from both the first set of cable pairs and the second set of cable pairs.

The PSE 902 is further configured to determine, according to the power receiving configuration TLV, whether the PD 901 receives power from both the first set of cable pairs and the second set of cable pairs, that is, determine a status of a configuration of receiving power by the PD 901. If it is determined, according to the power receiving configuration TLV, that the PD 901 receives power from only the first set of cable pairs, it may be determined that the Ethernet twisted pair is a Y-type Ethernet twisted pair, and the PD 901 is connected to the PSE 902 using only the first set of cable pairs in the Y-type Ethernet twisted pair, for example, the PD is the PD 4 in FIG. 4, or if it is determined, according to the power receiving configuration TLV, that the PD 901 receives power from only the second set of cable pairs, it may be determined that the Ethernet twisted pair is a Y-type Ethernet twisted pair, and the PD 901 is connected to the PSE 902 using only the second set of cable pairs in the Y-type Ethernet twisted pair, for example, the PD is the PD 5 in FIG. 4, or if it is determined, according to the power receiving configuration TLV, that the PD 901 receives power from both the first set of cable pairs and the second set of cable pairs, it may be determined that the Ethernet twisted pair is a standard-type Ethernet twisted pair, and the PD 901 is connected to the PSE 902 using both the first set of cable pairs and the second set of cable pairs that are in the standard-type Ethernet twisted pair, as shown in any one of FIG. 1 to FIG. 3.

The first LLDPDU may further include an interface quantity TLV, the interface quantity TLV is used to notify the PSE 902 of a quantity of PD interfaces included in the PD 901, and the quantity may be one or two.

The PSE 902 may be further configured to, when it is determined that the PD 901 receives power from both the first set of cable pairs and the second set of cable pairs, determine, according to the interface quantity TLV, whether the PD 901 includes two PD interfaces, that is, determine whether the PD 901 includes one PD interface or two PD interfaces. If it is determined, according to the interface quantity TLV, that the PD 901 includes only one PD interface, it indicates that the PD interface is connected to both the first set of cable pairs and the second set of cable pairs, as shown in FIG. 1. If it is determined, according to the interface quantity TLV, that the PD 901 includes two PD interfaces, it indicates that the two PD interfaces are separately connected to the first set of cable pairs and the second set of cable pairs. For example, the two PD interfaces are a first PD interface and a second PD interface, the first PD interface is connected to the first set of cable pairs, and the second PD interface is connected to the second set of cable pairs, as shown in FIG. 2 or FIG. 3.

For details that are not described in this embodiment, reference may be made to descriptions in FIG. 5 to FIG. 8 in the present disclosure, and details are not described herein again.

According to the PoE system provided in this embodiment of the present disclosure, the PSE 902 detects and determines that both a first set of cable pairs and a second set of cable pairs of an Ethernet twisted pair are connected to a valid powered device, and receives a first LLDPDU sent by the PD 901. In a case in which it is determined that the PD receives power from both the first set of cable pairs and the second set of cable pairs, and the PD 901 includes two PD interfaces, the PSE 902 determines, according to a load quantity TLV, whether the PD includes one PD load or two PD loads such that a design type of the PD 901 is determined. When it is determined that the PD includes two PD loads, the PSE 902 separately supplies, using the first set of cable pairs and the second set of cable pairs, power to the two PD loads at powers that are independent of each other. Therefore, it is ensured that power can be supplied to the PD 901 correctly and effectively.

The foregoing descriptions are merely exemplary specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A power over Ethernet (PoE) power supplying method, comprising:
  receiving, by power sourcing equipment (PSE), a first Link Layer Discovery Protocol data unit (LLDPDU) from a powered device (PD), wherein the first LLDPDU comprises a PD load indication and an interface quantity indication, wherein the interface quantity indication indicates that the PD comprises two PD interfaces, wherein the PD is connected to the PSE using an Ethernet twisted pair, and wherein the Ethernet twisted pair comprises a first set of cable pairs connected to a first PD interface and a second set of cable pairs connected to a second PD interface, and
  supplying, by the PSE, a first power to the first set of cable pairs and a second power to the second set of cable pairs, when the PSE determines, according to the PD load indication, that the PD comprises two PD loads, wherein the first power and the second power are independent of each other.

2. The method according to claim 1, wherein the first LLDPDU further comprises a power request indication, wherein the power request indication comprises a first requested power value of the first set of cable pairs and a second requested power value of the second set of cable pairs, and wherein the method further comprises:
  sending, by the PSE, a second LLDPDU to the PD,
  wherein the second LLDPDU comprises a power allocation indication, and
  wherein the power allocation indication comprises a first allocated power value of the first power that is allocated by the PSE to the first set of cable pairs and a second allocated power value of the second power that is allocated to the second set of cable pairs.

3. The method according to claim 1, further comprising:
  supplying, by the PSE, power to the PD according to power requirement information of the PD when the PSE determines, according to the PD load indication, that the PD comprises only one PD load.

4. The method according to claim 3, wherein the first LLDPDU further comprises a power request indication, wherein the power request indication comprises a first requested power value of the first set of cable pairs and a second requested power value of the second set of cable pairs, and wherein supplying, by the PSE, power to the PD according to power requirement information of the PD comprises:
  allocating, by the PSE, a third allocated power value to the first set of cable pairs and the second set of cable pairs according to a sum of the first requested power value and the second requested power value; and
  supplying, by the PSE, power to the PD at the allocated third power value using both the first set of cable pairs and the second set of cable pairs, such that the PD load obtains power using both the first set of cable pairs and the second set of cable pairs.

5. The method according to claim 4, wherein when the first requested power value and the second requested power value that are comprised in the power request indication are different, the third LLDPDU further comprises a power request error indication, which is used to indicate, to the PD, an error in one of the requested power value in the power request indication, and wherein the third allocated power value is the smaller one of the first requested power value and the second requested power value.

6. The method according to claim 1, wherein the first LLDPDU further comprises a power request indication, wherein the power request indication comprises a total requested power value of the Ethernet twisted pair, and wherein the method further comprises:
sending, by the PSE, a fourth LLDPDU to the PD, wherein the fourth LLDPDU comprises a power allocation indication, and wherein the power allocation indication comprises an indication of a total power value that is allocated by the PSE to the Ethernet twisted pair; and
supplying, by the PSE, power to the PD at the total power value using only the first set of cable pairs or using only the second set of cable pairs, such that the PD load obtains power using the first set of cable pairs or the second set of cable pairs when the total requested power value in the power request indication is not greater than a given value; or
supplying, by the PSE, power to the PD at half the total power value using both the first set of cable pairs and the second set of cable pairs, such that the PD load obtains power using both the first set of cable pairs and the second set of cable pairs when the total requested power value in the power request indication is greater than the given value.

7. The method according to claim 1, wherein the first LLDPDU further comprises a power receiving configuration indication, wherein the power receiving configuration indication is used to notify the PSE of a status of a configuration of receiving power by the PD from the Ethernet twisted pair, and wherein the method further comprises:
determining, by the PSE according to the power receiving configuration indication, that the PD is capable of receiving power from both the first set of cable pairs and the second set of cable pairs.

8. Power sourcing equipment (PSE), comprising:
an 8 position 8 contact (8P8C) modular connector connected to a powered device (PD) using an Ethernet twisted pair, wherein the Ethernet twisted pair comprises a first set of cable pairs and a second set of cable pairs;
a power supply control chip for controlling power supply to the PD via the 8P8C modular connector;
a memory storing program instructions; and
a processor coupled to the memory and the power supply control chip, wherein, when executing the program instructions by the processor, the PSE is configured to:
receive a first link layer discovery protocol data unit (LLDPDU) from the PD, wherein the first LLDPDU comprises a PD load indication and an interface quantity indication, wherein the interface quantity indication indicates that the PD comprises two PD interfaces, and wherein the first set of cable pairs is connected to a first PD interface and the second set of cable pairs is connected to a second PD interface; and
supply a first power to the first set of cable pairs and a second power to the second set of cable pairs when the PSE determines, according to the PD load indication, that the PD comprises two PD loads, wherein the first power and the second power are independent of each other.

9. The PSE according to claim 8, wherein the first LLDPDU further comprises a power request indication, wherein the power request indication comprises a first requested power value of the first set of cable pairs and a second requested power value of the second set of cable pairs, wherein the PSE is further configured to:
send a second LLDPDU to the PD,
wherein the second LLDPDU comprises a power allocation indication, and wherein the power allocation indication comprises a first allocated power value of the first power that is allocated by the PSE to the first set of cable pairs and a second allocated power value of the second power that is allocated to the second set of cable pairs.

10. The PSE according to claim 8, wherein the PSE is further configured to:
supply power to the PD according to power requirement information of the PD when the PD comprises only one PD load.

11. The PSE according to claim 10, wherein the first LLDPDU further comprises a power request indication, wherein the power request indication comprises a first requested power value of the first set of cable pairs and a second requested power value of the second set of cable pairs, and wherein the PSE is further configured to:
allocate a third allocated power value to the first set of cable pairs and the second set of cable pairs according to a sum of the first requested power value and the second requested power value that are in the power request indication; and
supply power to the PD at the third allocated power value using both the first set of cable pairs and the second set of cable pairs, such that the PD load obtains power using both the first set of cable pairs and the second set of cable pairs.

12. The PSE according to claim 11, wherein when the first requested power value and the second requested power value that are comprised in the power request indication are different, the third LLDPDU further comprises a power request error indication, which is used to indicate, to the PD, an error in one of the requested power value in the power request indication, and wherein the third allocated power value is the smaller one of the first requested power value and the second requested power value.

13. The PSE according to claim 8, wherein the first LLDPDU further comprises a power request indication, wherein the power request indication comprises a total requested power value of the Ethernet twisted pair, and wherein the PSE is further configured to:
send a fourth LLDPDU to the PD, wherein the fourth LLDPDU comprises a power allocation indication, and wherein the power allocation indication comprises an indication of a total power value that is allocated to the Ethernet twisted pair; and
supply power to the PD at the total power value using only the first set of cable pairs or using only the second set of cable pairs, such that the PD load obtains power using the first set of cable pairs or the second set of cable pairs when the total requested power value in the power request indication is not greater than a given value; or
supply power to the PD at half the total power value using both the first set of cable pairs and the second set of cable pairs, such that the PD load obtains power using both the first set of cable pairs and the second set of cable pairs when the total requested power value in the power request indication is greater than the given value.

14. The PSE according to claim 8, wherein the first LLDPDU further comprises a power receiving configuration indication, wherein the power receiving configuration indication is used to notify the PSE of a status of a configuration of receiving power by the PD from the Ethernet twisted pair, and wherein the PSE is further configured to:
  determine, according to the power receiving configuration indication, that the PD is capable of receiving power from both the first set of cable pairs and the second set of cable pairs.

15. A power over Ethernet system, comprising:
  a powered device (PD); and
  power sourcing equipment (PSE) capable of supplying power to the PD,
  wherein the PD is connected to the PSE using an Ethernet twisted pair, and the Ethernet twisted pair comprises a first set of cable pairs and a second set of cable pairs,
  wherein the PD is configured to send a first link layer discovery protocol data (LLDPDU) to the PSE,
  wherein the first LLDPDU comprises a PD load indication and an interface quantity indication,
  wherein the interface quantity indication indicates that the PD comprises two PD interfaces, the first set of cable pairs is connected to a first PD interface and the second set of cable pairs is connected to a second PD interface, and
  wherein the PSE is configured to:
    receive the first LLDPDU from the PD;
    determine whether the PD comprises two PD loads or one PD load according to the PD load indication; and
    supply a first power using the first set of cable pairs and a second power using the second set of cable pairs to the PD when the PD comprises two PD loads;
  wherein the first power and the second power are independent of each other.

* * * * *

UNITED STATES PATENT AND TRADEMARK OFFICE
CERTIFICATE OF CORRECTION

| | | |
|---|---|---|
| PATENT NO. | : 10,057,074 B2 | Page 1 of 1 |
| APPLICATION NO. | : 15/066630 | |
| DATED | : August 21, 2018 | |
| INVENTOR(S) | : Zhuang et al. | |

It is certified that error appears in the above-identified patent and that said Letters Patent is hereby corrected as shown below:

In the Drawings

Sheet 3 of 5, in "Fig. 6", for Tag "612", delete " 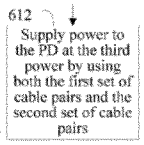 " and insert --  --, therefor.

Sheet 5 of 5, in "Fig. 8", for Tag "Processor 802", delete "  " and insert -- 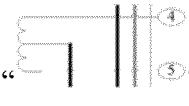 --, therefor.

Sheet 5 of 5, in "Fig. 8", for Tag "PSE chip 801", delete " " and insert -- 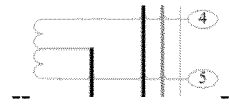 --, therefor.

Sheet 5 of 5, in "Fig. 8", for Tag "Transformer", delete " " and insert --  --, therefor.

Signed and Sealed this
Eleventh Day of October, 2022

Katherine Kelly Vidal
*Director of the United States Patent and Trademark Office*